United States Patent
Kolb et al.

(10) Patent No.: US 10,981,539 B2
(45) Date of Patent: Apr. 20, 2021

(54) BRAKE DISK LOCK

(71) Applicant: ABUS August Bremicker Soehne KG, Wetter-Volmarstein (DE)

(72) Inventors: Marcus Kolb, Girod (DE); Marvin Mueller, Salz (DE); Bernd Weiershausen, Rehe (DE)

(73) Assignee: ABUS August Bremicker Soehne KG, Wetter-Volmarstein (DE)

( * ) Notice: Subject to any disclaimer, the term of this patent is extended or adjusted under 35 U.S.C. 154(b) by 51 days.

(21) Appl. No.: 16/405,862

(22) Filed: May 7, 2019

(65) Prior Publication Data

US 2019/0344754 A1 Nov. 14, 2019

(30) Foreign Application Priority Data

May 11, 2018 (DE) .......................... 102018111287.4

(51) Int. Cl.
*B60R 25/08* (2006.01)
*H04W 12/00* (2021.01)
*H04W 12/06* (2021.01)

(52) U.S. Cl.
CPC ....... *B60R 25/08* (2013.01); *H04W 12/00502* (2019.01); *H04W 12/06* (2013.01)

(58) Field of Classification Search
CPC . B60R 25/08; H04W 12/00502; H04W 12/06
USPC .................................................... 340/426.3
See application file for complete search history.

(56) References Cited

U.S. PATENT DOCUMENTS

| | | | |
|---|---|---|---|
| 2003/0213092 A1* | 11/2003 | Fischbach ............... | E05F 15/42 16/52 |
| 2009/0145704 A1* | 6/2009 | Weiershausen .......... | B62H 5/18 188/265 |
| 2009/0145705 A1* | 6/2009 | Weiershausen .......... | B62H 5/18 188/265 |

(Continued)

FOREIGN PATENT DOCUMENTS

| | | |
|---|---|---|
| DE | 92 09 927 U1 | 9/1992 |
| DE | 90 08 927 U1 | 11/1992 |

(Continued)

OTHER PUBLICATIONS

German search report dated Mar. 29, 2019 in corresponding German patent application No. 10 2018 111 287.4 (14 pages).

(Continued)

*Primary Examiner* — Ojiako K Nwugo
(74) *Attorney, Agent, or Firm* — Kilpatrick Townsend & Stockton LLP

(57) ABSTRACT

The invention relates to a brake disk lock comprising a brake disk detection device, a sensor for detecting a positional change of the lock, an alarm module that is configured to output an alarm when the sensor detects a relevant positional change of the lock, an unlocking motor for unlocking the lock, an authentication module for a wireless authentication of a user of the lock, and an actuation element that can be actuated by the user and by means of which the authentication module can be activated. A further subject is a locking system comprising such a lock and a mobile end device by means of which a user of the brake disk lock can authenticate himself thereat. The invention further relates to a method of unlocking a brake disk lock.

21 Claims, 3 Drawing Sheets

(56) References Cited

U.S. PATENT DOCUMENTS

Figure 1:
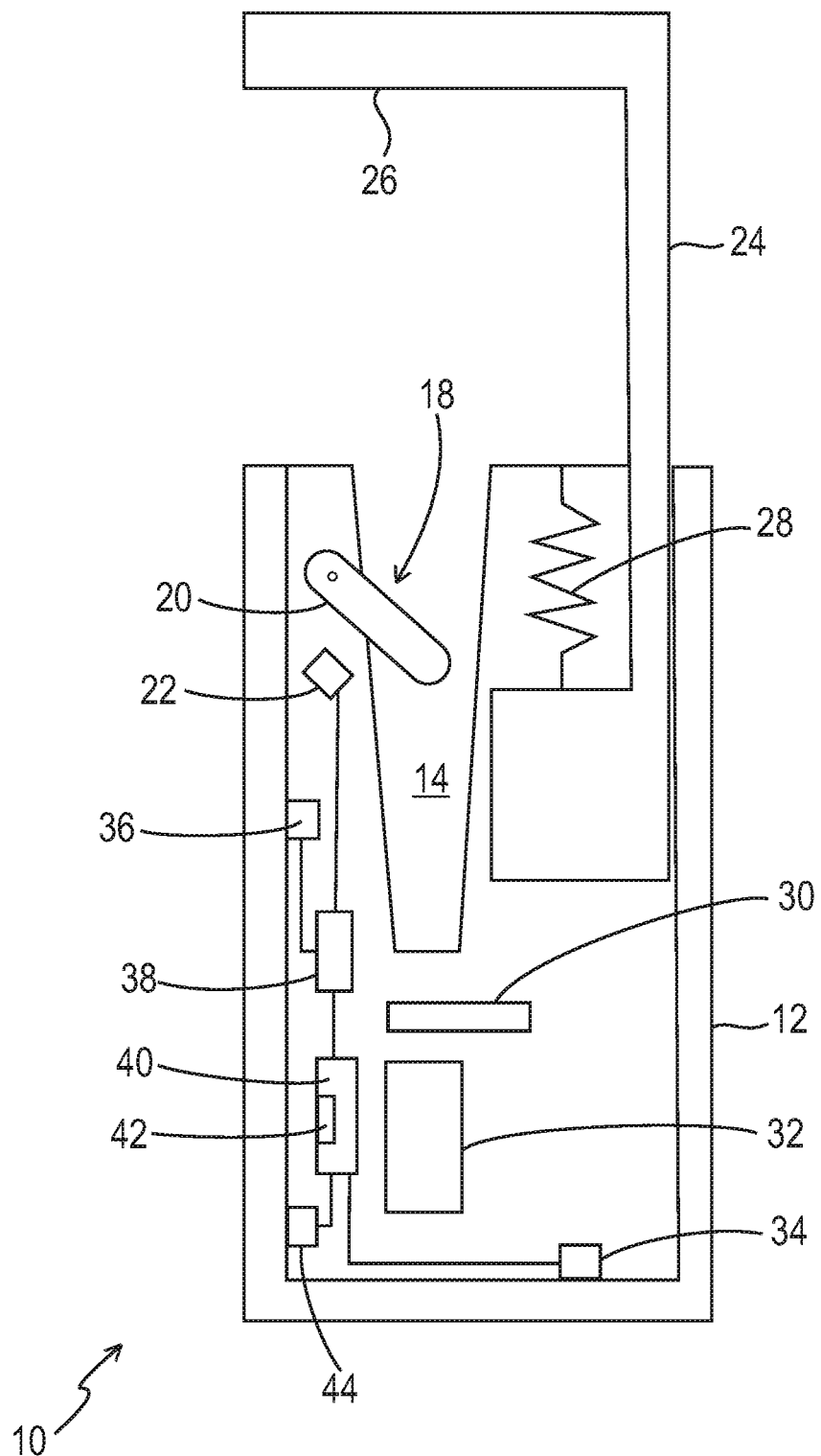

| | | | |
|---|---|---|---|
| 2011/0067961 A1* | 3/2011 | Duits | F16D 63/006 |
| | | | 188/82.84 |
| 2011/0221265 A1* | 9/2011 | Busack | B60T 8/17616 |
| | | | 303/152 |
| 2013/0116904 A1* | 5/2013 | Watanabe | B60T 13/741 |
| | | | 701/70 |
| 2013/0252784 A1* | 9/2013 | Kinoshita | B60W 10/184 |
| | | | 477/92 |
| 2014/0069750 A1* | 3/2014 | Nohira | F16D 65/62 |
| | | | 188/71.8 |

FOREIGN PATENT DOCUMENTS

| | | |
|---|---|---|
| EP | 0 716 007 B1 | 3/1999 |
| EP | 1 764 292 A2 | 3/2007 |
| JP | H11 278331 A | 10/1999 |
| NL | 2 000 149 C2 | 1/2008 |
| WO | 2011/010768 A1 | 1/2011 |

OTHER PUBLICATIONS

Extended European Search report dated Sep. 11, 2019 in corresponding European Patent Application No. 19170149.9 (nine pages).

* cited by examiner

BRAKE DISK LOCK

This application claims priority to German Patent Application No. 102018111287.4, filed May 11, 2018, the disclosure of which is incorporated by reference herein.

The present invention relates to a brake disk lock having a brake disk detection device, a sensor for detecting a positional change of the lock, and an alarm module that is configured to output an alarm when the sensor detects a relevant positional change of the lock.

Such brake disk locks are generally known and are in particular used to secure motorcycles or motor scooters. The sensor and the alarm module serve to increase theft protection in that on an attack on the lock, a movement thereof is detected and an alarm is output as a deterrent. In this respect, the brake disk detection device ensures that the movement detection and optionally the output of an alarm only take place when the lock is actually attached to a brake disk.

Conventional brake disk locks have a lock cylinder and can accordingly be unlocked by a key associated with the lock.

It is the underlying object of the invention to provide a brake disk lock that is characterized by a more comfortable and more secure operation.

The object is satisfied by a brake disk lock in particular in that the brake disk lock comprises an unlocking motor for unlocking the lock, an authentication module for a wireless authentication of a user of the lock, and an actuation element that can be actuated by the user and by means of which the authentication module can be activated.

It is the underlying general idea of the invention to carry out the unlocking of the brake disk lock differently than conventionally usual not by means of a physical key matching the brake disk lock, but instead to carry out a wireless authentication of the user in that the brake disk lock, more precisely the authentication module, connects to a mobile end device of the user, for example via Bluetooth, for example to a smartphone, a smart watch, or a remote control associated with the brake disk lock and, in the case of a successful user authentication, in that the authentication module activates the unlocking motor, preferably an electric motor, to unlock the brake disk lock. The user therefore does not have to take up a physical key for the unlocking of the brake disk lock, but rather only has to carry along the mobile end device. Due to the wireless communication between the authentication module and the mobile end device, the user does not even have to take the mobile end device out of his pocket for the authentication.

To prevent the brake disk lock from already being unintentionally unlocked when the user is only in the vicinity of the lock with his mobile end device, the user has to carry out a deliberate action for the actual unlocking of the brake disk lock, namely to actuate the actuation element, for example in that he pushes a latch of the lock into a lock body of the lock and/or moves the latch from a closed position into an overlift position. The authentication module is only caused to carry out an authentication procedure by the actuation of the actuation element. A successful user authentication here results in an activation of the unlocking motor by which the lock is unlocked.

In every case, a relevant positional change of the lock, either by an attack on the lock or on an actuation of the actuation element, results in an output of an alarm that contributes to a deterrent in the case of an attack and that in the event of an actuation of the actuation element by the user is intended to remind the user not only to unlock the lock, but also to remove it from the brake disk. In the latter case, the alarm has the function of a reminder, i.e. the alarm should prevent the user from forgetting to remove the unlocked lock from the brake disk. The risk that the user drives off with the motorcycle or motor scooter while the unlocked lock is still hanging at the brake disk, which can result in substantial damage to the motorcycle or motor scooter, can be considerably reduced in this manner.

Advantageous embodiments of the invention can be seen from the dependent claims, from the description and from the drawing.

In accordance with an embodiment, a relevant positional change is present when the position of the lock relative to a starting position changes by more than a predefined amount in at least one spatial direction. An alarm can, for example, be output when the sensor detects an angular change of the lock of a plurality of degrees, for example of 4°, about at least one spatial axis. The sensor can, for example, be an acceleration sensor.

That position of the lock can be used as the starting position that the sensor determines when the brake disk detection device detects the presence of a brake disk and the lock has not changed its position for a predefined minimum period. The predefined minimum time period can here be in the range of some seconds and can, for example, amount to 5 s.

In accordance with a further embodiment, the alarm module is configured only to read the sensor when the brake disk detection device detects the presence of a brake disk. It is therefore a requirement for the outputting of an alarm that the lock is attached to a brake disk. On a use of the lock not in accordance with its intended purpose, e.g. during the transport of the lock, the alarm function is therefore switched off.

The alarm module is advantageously configured to abort an alarm output when no further positional change is detected within a predefined time period after the relevant positional change or when a user successfully carried out a user authentication. The predefined time period is preferably selected as at least not substantially larger than the time that is required to carry out the user authentication and can, for example, be <2 s and preferably <1 s. It is ensured in this manner that the reminder function is admittedly satisfied, but the user is not disturbed by a continuing alarm in the event of a successful user authentication. In addition, it can be assumed if no further positional change of the lock is detected that it is not an attack on the lock, but that the positional change was rather caused by an animal brushing by, in which case the output of a continuing alarm is likewise not necessary.

In accordance with a further embodiment, the authentication module can be activated by the attachment of the lock to a brake disk. This also enables the authentication of the user on the attachment of the lock to the brake disk and, in the event of a successful user authentication, an activation of the unlocking motor to lock the lock.

In addition, a visual and/or acoustic status display can be provided to signal the charge state of an energy supply of the lock for a further increase in operating comfort. The charge state is preferably signaled on every activation of the unlocking motor.

A further subject matter of the invention is a locking system having a brake disk lock of the above-described kind and a mobile end device by means of which a user of the lock can be authenticated thereat. The advantages named above in connection with the brake disk lock apply accordingly to the locking system in accordance with the invention.

So that the mobile end device can communicate with the authentication module of the lock, the mobile end device advantageously also comprises a transmission/reception unit to establish a wireless connection to the authentication module of the lock.

As already mentioned, the mobile end device can be a remote control or a portable computer, in particular a smart watch, a smartphone, a tablet, etc.

A further subject of the invention is moreover a method by which the aforesaid advantages can be correspondingly achieved.

Figure 2:
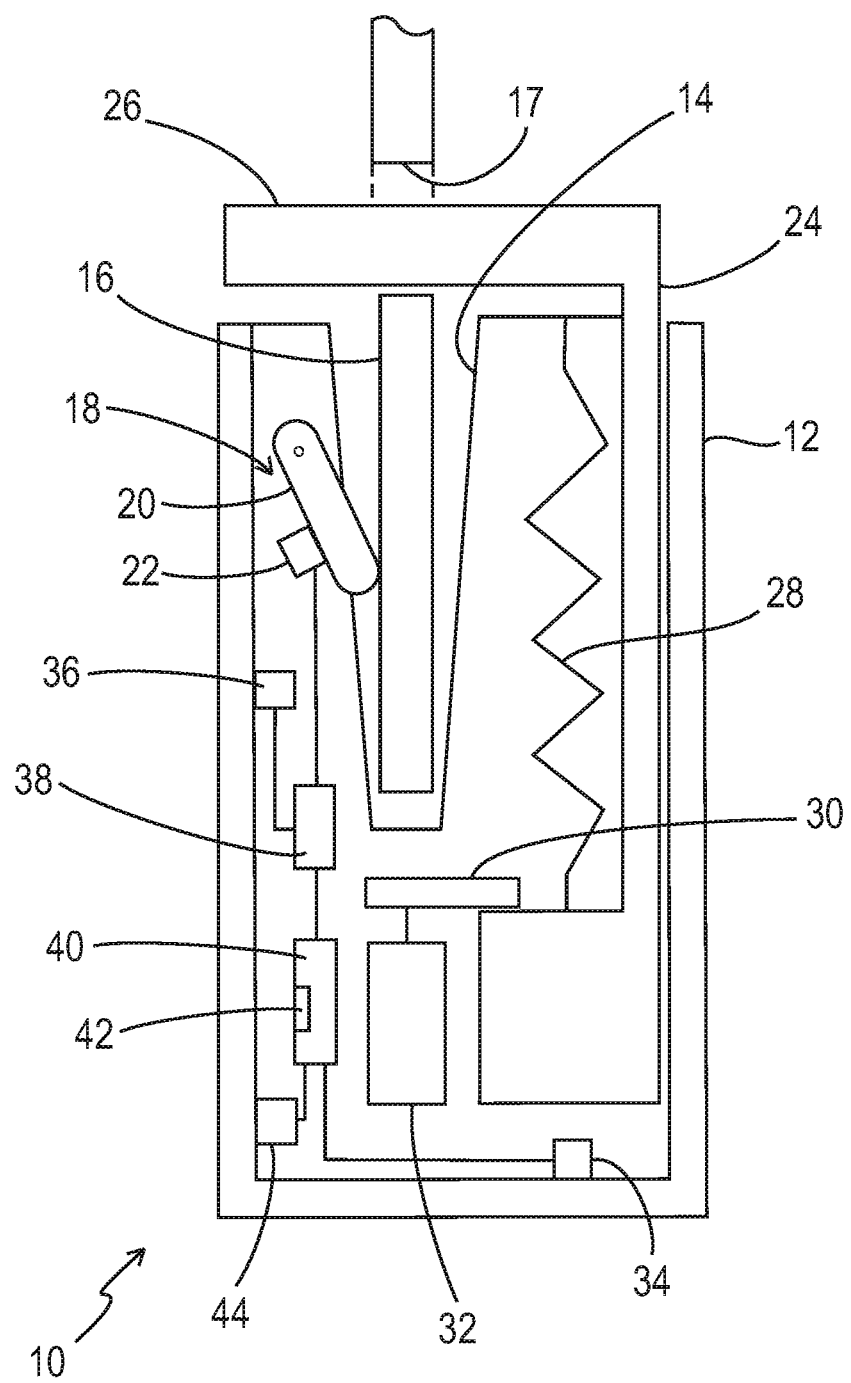
Figure 3:
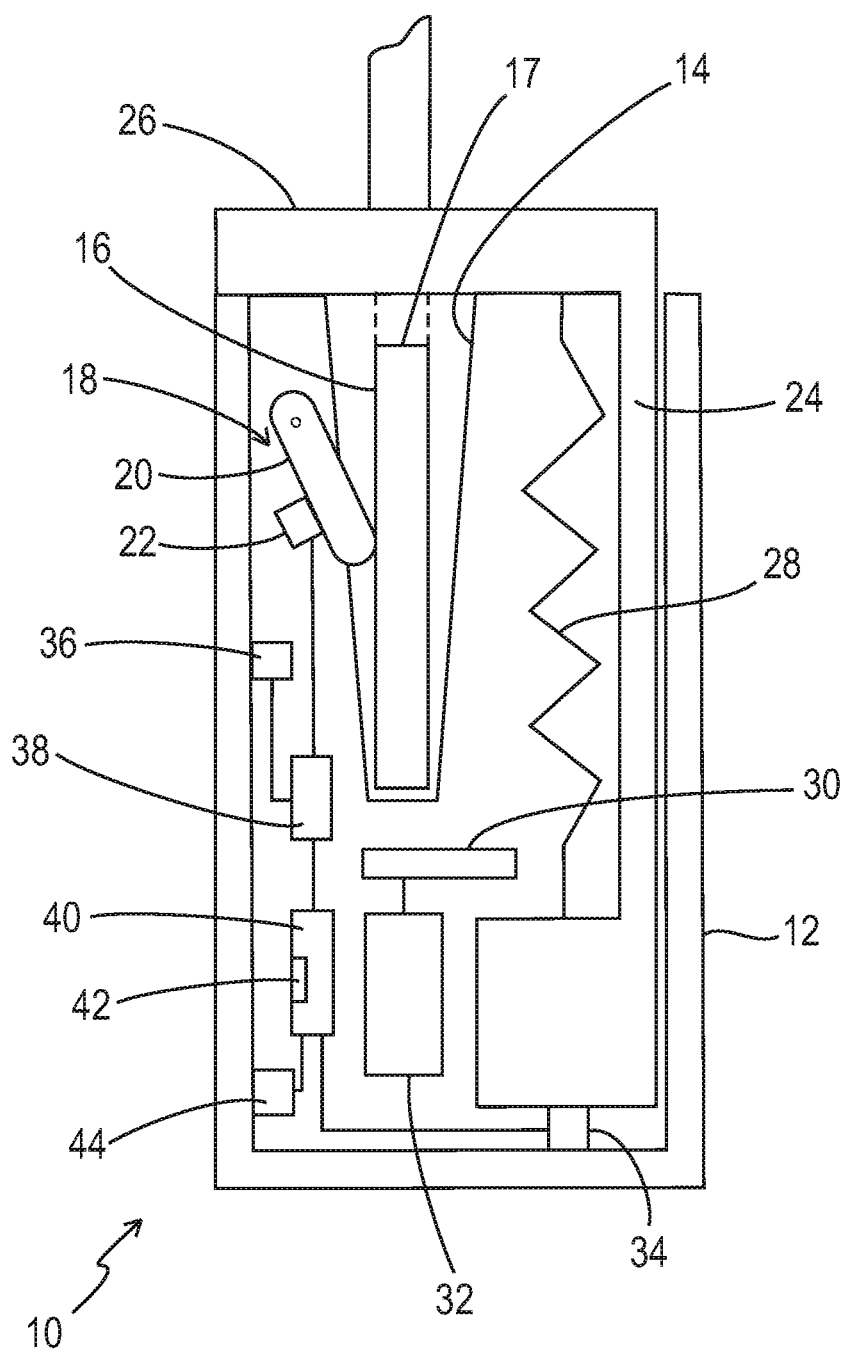

The invention will be described in the following purely by way of example with reference to a possible embodiment and to the enclosed drawing. There are shown:

FIG. 1 a schematic representation of a brake disk lock in accordance with the invention in an open state;

FIG. 2 a schematic representation of the brake disk lock of FIG. 1 in a closed state; and FIG. 3 a schematic representation of the brake disk lock of FIG. 1 in an overlift state.

The brake disk lock 10 shown in the Figures comprises a lock body 12 that forms a mount 14 for a brake disk 16. To detect a brake disk 16 received in the mount 14, the brake disk lock 10 has a brake disk detection device 18 that comprises a rotatably supported detection lever 20 that projects into the mount 14, that is rotated by a brake disk 16 received in the mount 14, and that actuates a switch 22. The switch 22 is arranged and configured such that it adopts a closed state when there is no brake disk 16 in the mount 14 and adopts an open state when a brake disk 16 is received in the mount 14.

To secure the brake disk 16 received in the mount 14, the lock 10 comprises a latch 24 that is displaceably supported in the lock body 12 and that has a latch pin 26 in the region of its end remote from the lock body 12 that extends transversely to the direction of displacement and that can be led through a bore 17 provided in the brake disk 16.

The latch 24 can be displaced from an open position (FIG. 1) partly moved out of the lock body 12 in which a mounting of the lock at a brake disk 16 is possible against the return force of an opening spring 28 into a closed position in the lock body 12 in which the latch 24 is blocked or locked by means of a locking element 30 (FIG. 2).

To open the lock 10, the locking element 30 can be released from the latch 24 with the aid of an unlocking motor 32, here in the form of an electric motor, so that the latch 24 is urged into its open position by the opening spring 28, that is so-to-say jumps open.

The latch 24 can be moved into the lock body 12 beyond its closed position (FIG. 2) by pressing the latch 24 and the lock body 12 together until said latch 24 reaches an overlift position (FIG. 3) that is detected by an overlift switch 34.

The lock further has a sensor 36 for detecting a positional change of the lock 10. The sensor 36 can, for example, be an acceleration sensor.

The sensor 36 is connected to an alarm module that outputs an alarm, in particular an acoustic alarm, when the brake disk detection device 18 detects a brake disk 16 received in the mount 14 and the sensor 36 detects a relevant positional change. A relevant positional change can be present, for example, when the position of the lock 10 relative to a starting position of the lock 10 changes by more than a predefined amount in at least one spatial direction. A relevant positional change can in particular be present when the sensor 36 detects an angular change at the lock 10 about at least one spatial axis that that is larger than 4°, for example.

That position of the lock 10 is called the starting position of the lock 10 that the sensor 36 determines when the brake disk detection device 18 detects the presence of a brake disk 16 in the mount 14 and the lock 10 has not changed its position for a predefined minimum period in the range of some seconds, for example of 5 seconds.

To check the authorization of a user operating the lock 10, the lock 10 furthermore has an authentication module 40 that has a Bluetooth enabled transmission/reception unit 42 that is configured to establish a wireless connection to a mobile end device, not shown here, of the user, for example to a smartphone, to a smart watch, or to a remote control associated with the lock 10 to authenticate the user by means of the mobile end device.

The authentication module 40 is connected to the overlift switch 34 and is activated as soon as the overlift switch 34 is actuated. To activate the authentication module 40 and to trigger an authentication process, the user therefore deliberately has to press the latch 24 and the lock body 12 together beyond the closed position of the latch 24 until the latch 24 reaches its overlift position and the overlift switch 34 is actuated. The overlift switch 34 in other words therefore forms an actuation element 34 whose actuation is a requirement for an unlocking of the lock 10.

If not only the unlocking should take place electronically, but also the locking of the lock 10, it is conceivable that the latch 24 also has to be moved into its overlift position for the locking to actuate the overlift switch 34 and hereby to activate the authentication module 40 and to trigger an authentication procedure.

Since the actuation of the actuation element 34 will typically not take place without a positional change of the lock 10 detected by the sensor 36, the alarm module 38 necessarily outputs an alarm on an actuation of the actuation element 34. The authentication module 40 can, however, determine on the basis of the user authentication triggered by the actuation of the actuation element 34 whether the movement of the lock 10 has taken place by an authorized user, in which case the alarm is switched off.

If the user authentication does not take place successfully, but if simultaneously no further positional change of the lock 10 is detected, it is assumed that the positional change of the lock 10 triggering the alarm was unintentional and the alarm is likewise switched off.

It is only assumed that an unauthorized attack on the lock 10 has taken place in the event of an unsuccessful user authentication and a continued movement or positional change of the lock and the alarm output is maintained as protection against theft.

Finally, the lock 10 also comprises a visual and/or acoustic status display 44 for signaling the charge state of an energy supply, not shown, of the lock 10 that is activated, in particular on every, on activation of the unlocking motor 32.

REFERENCE NUMERAL LIST 10 lock
12 lock body
14 mount
16 brake disk
17 bore
18 brake disk detection device
20 detection lever
22 switch
24 latch
26 latch pin
28 opening spring 30 locking element
32 unlocking motor
34 overlift switch
36 sensor
38 alarm module
40 authentication module
42 transmission/reception unit
44 status display

The invention claimed is:

1. A brake disk lock comprising
a brake disk detection device;
a sensor configured to detect a positional change of the brake disk lock;
an alarm module configured to output an alarm in response to the sensor detecting a relevant positional change of the brake disk lock;
an unlocking motor configured to unlock the brake disk lock;
an authentication module configured to receive a wireless authentication of a user of the brake disk lock; and
an actuation element configured to be actuated by the user and further configured to activate the authentication module.

2. The brake disk lock in accordance with claim 1,
wherein the relevant positional change is defined by a position of the brake disk lock relative to a starting position changing by more than a predefined amount in at least one spatial direction.

3. The brake disk lock in accordance with claim 2,
wherein the starting position of the brake disk lock is defined by the position of the brake disc lock when the brake disk detection device detects the presence of a brake disk and the sensor has not detected a positional change in the brake disk lock for a predefined minimum period of time.

4. The brake disk lock in accordance with claim 3,
wherein the predefined minimum period of time is in the range of 5 seconds.

5. The brake disk lock in accordance with claim 1,
wherein the alarm module is configured only to read the sensor when the brake disk detection device detects the presence of a brake disk.

6. The brake disk lock in accordance with claim 1,
wherein the alarm module is configured to abort an alarm output when no further positional change is detected within a predefined time after the relevant positional change or when a user authentication has been successfully carried out.

7. The brake disk lock in accordance with claim 1,
wherein the authentication module is configured to be activated by the attachment of the brake disk lock to a brake disk.

8. The brake disk lock in accordance with claim 1,
further comprising a visual and/or acoustic status display configured for indicating a charge state of an energy supply of the brake disk lock.

9. The brake disk lock in accordance with claim 1, further comprising:
a latch configured to be moved from an open position into a closed position and from the closed position into an overlift position; wherein the actuation element is formed by an overlift switch configured to be actuated by a movement of the latch into the overlift position.

10. The brake disk lock in accordance with claim 1, further comprising:
a lock body; and
a latch displaceably supported in the lock body, wherein the actuation element is configured to be actuated by pushing the latch into the lock body.

11. A locking system comprising a brake disk lock and a mobile end device by means of which a user of the lock can authenticate himself thereat, wherein the brake disk lock comprises:
a brake disk detection device;
a sensor configured to detect a positional change of the brake disk lock;
an alarm module configured to output an alarm in response to the sensor detecting a relevant positional change of the brake disk lock;
an unlocking motor configured to unlocking the brake disk lock;
an authentication module for configured to receive a wireless authentication of a user of the brake disk lock; and
an actuation element configured to be actuated by the user and by means of which the authentication module can be activated.

12. The locking system in accordance with claim 11,
wherein the mobile end device comprises a transmission/reception unit configured to establish a wireless connection to the authentication module of the brake disk lock.

13. The locking system in accordance with claim 11,
wherein the mobile end device is a remote control or a portable computer.

14. A method of unlocking an electronic brake disk lock comprising an actuation element actuable by a user of the brake disk lock, an authentication module for a wireless authentication of the user, a sensor for detecting a positional change of the brake disk lock, and an alarm module, the method comprising:
actuating the actuation element to activate the authentication module; and
outputting an alarm through the alarm module in response to the sensor detecting a relevant positional change of the brake disk lock.

15. The method in accordance with claim 14,
wherein the relevant positional change is defined by a position of the brake disk lock relative to a starting position changing by more than a predefined amount in at least one spatial direction.

16. The method in accordance with claim 15,
wherein the starting position of the brake disk lock is defined by the position of the brake disc lock when the brake disk detection device detects the presence of a brake disk and the sensor has not detected a positional change in the brake disc lock for a predefined minimum period of time.

17. The method in accordance with claim 16,
wherein the predefined minimum period of time is in the range of 5 seconds.

18. The method in accordance with claim 14,
wherein the sensor is only read for so long as the brake disk detection device detects the presence of a brake disk.

19. The method in accordance with claim 14,
wherein the alarm module aborts the alarm output when no further positional change is detected within a predefined time period after the relevant positional change or when a user authentication has been successfully carried out.

20. The method in accordance with claim 14,
wherein the authentication module is activated when the brake disk detection device detects the attachment of the brake disk lock to a brake disk.

21. The method in accordance with claim 14,
wherein the actuation element is actuated by pushing a latch of the brake disk lock into a lock body of the brake disk lock and/or by moving a latch of the brake disk lock from a closed position into an overlift position.

* * * * *